April 13, 1965 D. J. HAMILTON 3,178,692
MEMORY SENSING SYSTEM
Filed Nov. 18, 1960 3 Sheets-Sheet 1

INVENTOR.
DOUGLAS J. HAMILTON
BY Louis P. Ellinger
ATTORNEY.

INVENTOR.
DOUGLAS J. HAMILTON
BY
Louis P. Elbinger
ATTORNEY.

April 13, 1965 D. J. HAMILTON 3,178,692

MEMORY SENSING SYSTEM

Filed Nov. 18, 1960 3 Sheets-Sheet 3

INVENTOR.
DOUGLAS J. HAMILTON.
BY
ATTORNEY.

3,178,692
Patented Apr. 13, 1965

3,178,692

MEMORY SENSING SYSTEM

Douglas J. Hamilton, Tucson, Ariz., assignor to General Electric Company, a corporation of New York Filed Nov. 18, 1960, Ser. No. 70,233
8 Claims. (Cl. 340—174)

This invention relates to memory sensing systems for use in electronic digital computers, and more particularly to apparatus for sensing information stored in a computer memory.

The utilization of coincident current magnetic core storage for storing digital information is presently well known in the art. Generally, such magnetic core storage devices utilize toroidal shaped cores of a material having a substantially rectangular hysteresis characteristic. The toroidal cores are provided with two energizing or drive windings each; further, a sensing winding, common to all cores, is provided for sensing the presence of stored information in any of the cores. Each drive winding of each core is usually a single turn winding in the form of a single conductor passing through the center of a toroidal core. Since each core is provided with two drive windings, two conductors, perpendicular to each other, are passed through each core and are connected to suitable sources of driving current. These two conductors are commonly referred to as the X and Y drive windings.

To simplify the construction of such magnetic storage devices, the cores are arranged in rows and columns to form a matrix. Each row of cores is threaded with a common conductor, or X winding, and each column is threaded with a common conductor or Y winding. In addition, another conductor, the sense winding, is threaded through all of the cores in the matrix. The resulting structure is commonly known as a core plane.

Usually, a plurality of such core planes are included as the information storage or memory of a computer. Since it is possible to sense, or read out any given core in each of the planes of the memory at any instant, such a memory storage system is referred to as a random access core memory.

If current is passed through the windings of a core to induce flux in a given direction and drive the core to magnetic saturation, the presence of the particular state of saturation may conveniently be designated a binary "1" state. If the current in the drive windings is in the opposite direction, the core is then saturated with flux in the opposite direction, and the reverse state of saturation may be utilized to indicate a binary "0" state. Therefore, any core in a given matrix may be saturated in either of two directions, and the state of saturation utilized to indicate the existence of a binary "1" or a binary "0."

To determine whether a binary "1" or "0" is stored in any particular core of a core plane, a read current pulse may be passed through each of the two windings of the core in the direction corresponding to the direction required to drive the core to its "0" state. The read current pulse is half the current required to drive a core from one state of saturation to the reverse state of saturation; therefore, a read current pulse supplied to the X and Y drive windings of a particular core will be sufficient to drive the particular core from one state of saturation to the other. If the particular core being read is already in its "0" state, the state of saturation will not be changed, and no substantial change in flux will occur. Therefore, little or no voltage will be induced in the previously mentioned sense winding by the changing flux in the particular core. Conversely, if the core is in the "1" state, a flux reversal will occur, and the core will be driven to the "0" state of saturation. The changing flux accompanying the change of state of saturation will induce a sense voltage in the sense winding therefore indicating the storage of a binary "1" on that particular core.

The information stored in a selected core which is being sensed will be either a binary "1" or "0." If a "1" is stored, an output voltage will be produced in a sense winding of the core when a read current pulse is applied to the core as explained previously; if a "0" is stored, no substantial output voltage will be produced. The sensing of a core is usually accompanied by noise. This noise may be attributed largely to the cores in the plane which are not being sensed but which have received a half-current pulse, that is, those cores having either the same X winding or same Y winding as the selected core. Since the X and Y windings of the selected core have each received a current pulse only half the magnitude required to change the state of the selected core, the combined current pulses in both windings change the state of only the selected core and provide a half-current pulse to the cores on the common X or Y windings. Since the hysteresis characteristic of the core material is not perfectly rectangular, a slight change in flux occurs in the cores receiving the half-current pulse, and a corresponding voltage, a noise voltage, will be produced in the sense winding. That is, the sense winding output voltage will include both the sense voltage caused by a change of state of saturation of the selected core and a noise voltage. To further complicate the noise problem, the noise voltage delivered by the sense winding to the sensing equipments may be of either polarity, and its magnitude will be a function of the amount of cancellation that is obtained by the method used in winding sense windings and the previous history of all cores which receive half-current pulses. It is probable that the magnitude of the peak noise voltage in the sense winding under certain circumstances will be several times the minimum peak sense voltage in the sense winding.

Because of the way the sense winding threads the cores, the sense winding output voltage may be either positive or negative, depending upon the sensed cores position in the matrix plane. Therefore, to properly sense a random access core memory utilizing a plurality of matrix core planes, it is necessary for the sensing apparatus to be capable of sensing a sense winding output voltage of either polarity, and to be capable of sensing this voltage in the presence of a noise voltage.

Accordingly, it is the primary object of the present invention to provide a reliable memory sensing system.

It is also an object of the present invention to provide a memory sensing system capable of sensing positive and negative magnetic memory sense winding output voltages.

It is another object of the present invention to provide a memory sensing system capable of distinguishing between sensing voltages and noise voltages present in a magnetic memory sense winding output voltage.

It is another object of the present invention to provide a memory sensing system for extracting information stored in a random access core memory and for supplying the information in useful form to utilization circuits.

It is another object of the present invention to provide a circuit for producing an output pulse in response to a magnetic memory sense winding output voltage.

It is a further object of the present invention to provide a circuit for comparing a magnetic memory sense winding output voltage to a threshold voltage.

Further objects and advantages of the present invention will become apparent to those skilled in the art as the description thereof proceeds.

Briefly stated, in accordance with one aspect of the present invention, a memory sensing system is provided for comparing an amplified magnetic core sense winding output voltage to a threshold voltage, and for producing an output pulse when the amplified sense winding output voltage exceeds the threshold. The sensing system includes a comparator circuit having a pair of transistors. The respective collector and emitter electrodes of the transistors are connected to each other and to a suitable source of bias potenital, and the base electrodes are adapted to receive an amplified magnetic memory sense winding output voltage. The output from the pair of transistors is regeneratively coupled to a third transistor which generates a switching current for energizing an output transistor. The system provides an output pulse of predetermined magnitude and duration whenever the amplified sense winding output voltage exceeds the given threshold voltage; further, the polarity of the output pulse of the system is independent of the polarity of the sense winding output voltage. The system is provided with strobe pulses for sampling the output of the comparator at selected intervals; in addition, since large noise voltages usually precede the signal voltages in a sense winding, the sensing system is inhibited for the duration of the noise voltage peak, and is provided with an enabling pulse to permit the system to operate during the interval following the peak noise voltage.

The invention both as to its organization and operation, together with further objects and advantages thereof may best be understood by reference to the following description taken in connection with the accompanying drawings in which.

Figure 1:
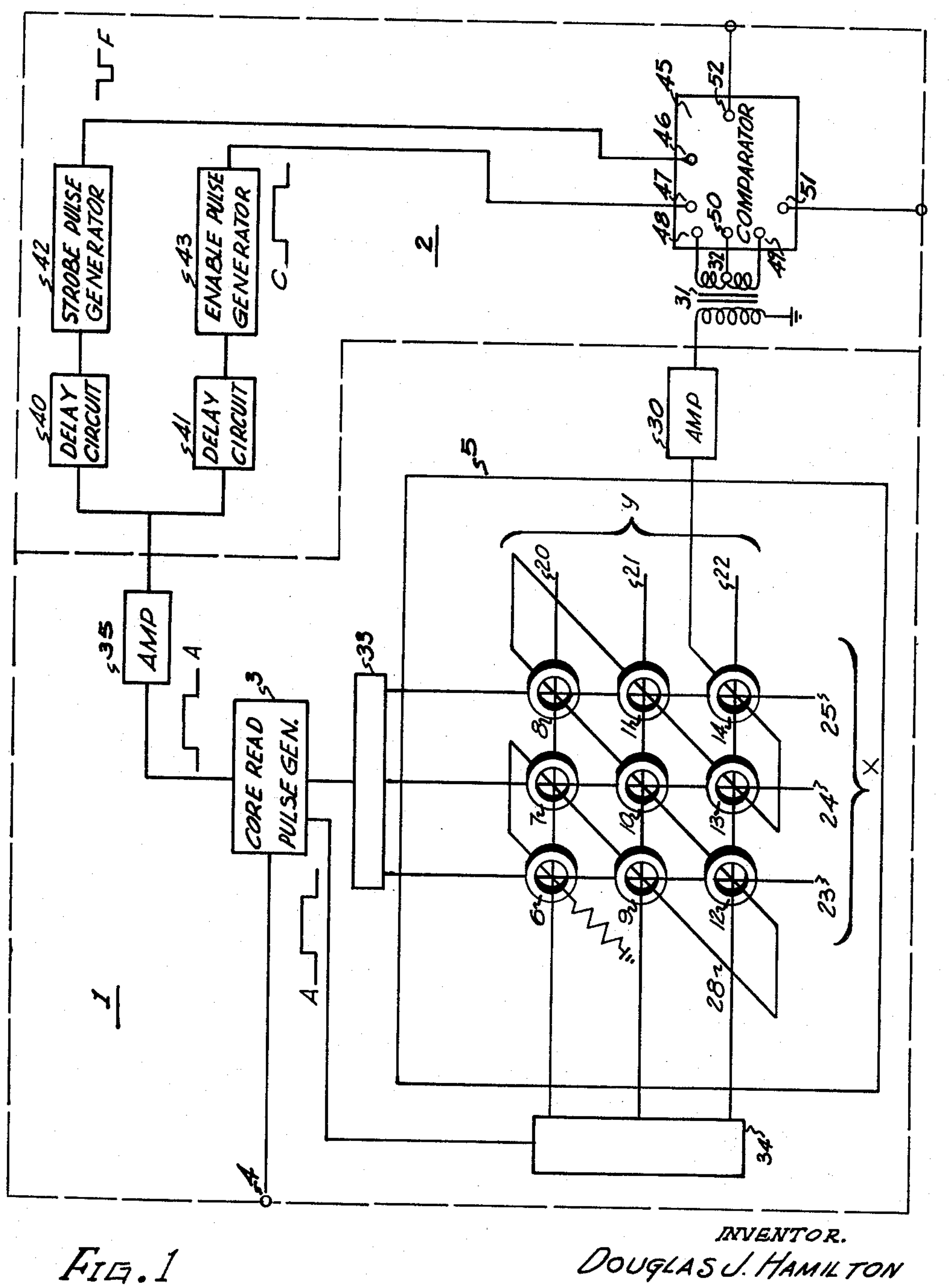
FIGURE 1 shows a memory sensing system, incorporating the teachings of the present invention, connected to a typical computer memory system.

Referring to FIGURE 1, a typical computer memory system 1 is shown connected to the memory sensing system 2 of the present invention. The computer memory system includes a core read pulse generator 3 connected to receive a synchronizing signal, such as a clock pulse which may be generated within the computer, at terminal 4. A core memory plane 5 for storing information in the form of digital bits, may be connected to receive pulses from the core read pulse generator. The core memory plane 5 includes a plurality of magnetic toroidal cores 6, 7, . . . 14 arranged in rows and columns to form a matrix. Each of the cores 6–14 is provided with a Y winding 20, 21, or 22, and an X winding 23, 24, or 25. In addition, a sense winding 28 is threaded through all the cores in the plane to provide a means for sensing the existence of a stored "1" or "0" on a selected core of the core plane. Address switching devices 33 and 34 are provided for directing the core read pulse to the proper X and Y windings. The core memory plane 5 is adapted to provide a sense winding output voltage to a sense amplifier 30. The computer memory system 1 may also be provided with a core read pulse amplifier 35 connected to receive the core read pulses from the pulse generator 3.

The memory sensing system 2 of the present invention includes delay circuits 40 and 41 connected to receive the amplified core read pulses from the amplifier 35 and to provide delayed pulses to strobe pulse generator 42 and enable pulse generator 43 respectively. The output of the sense amplifier 30 is connected to the primary winding of a transformer 31 having a center tapped secondary winding 32. A comparator 45 is connected to receive strobe pulse F and enable pulse C at terminals 46 and 47 respectively. The comparator is also connected to the center tapped secondary winding 32 of the transformer 31 at terminals 48, 49, and 50. The comparator 45 is adapted to receive a threshold bias voltage at terminal 51 from a suitable potential source (not shown)). The output of the memory sensing system 2 may be taken from terminal 52 of the comparator circuit 45.

The operation of the memory sensing system 2 of FIG. 1 may be described in connection with the wave forms of FIG. 3. If it is assumed that core 7 of core memory plane 5 is to be sensed to determine the presence or absence of a stored binary "1," then a synchronizing signal will be delivered to terminal 4 of the computer memory system 1. In response to the synchronizing signal, core read pulse generator 3 will generate a read pulse A and supply the pulse to core read pulse amplifier 35 and to address switching devices 33 and 34. The address devices will direct the pulse to the proper X and Y windings. The pulse is thus supplied to Y winding 20 and X winding 24 and is of such polarity as to drive the core 7 to the state of saturation designated as a binary "0." If the core 7 had been in the binary "1" state of saturation, the flux of the core 7 would be reversed, and the change of flux would induce a voltage in the sense winding 28. If the core 7 had been a "0" state of saturation, no appreciable change in the flux of the core would occur, and no substantial voltage would be induced in the sense winding 28. For purposes of illustration, it will be assumed that the core 7 is in a "1" state of saturation. However, whether or not a binary "1" is stored in core 7, noise voltages will be induced in the sense winding 28 as explained previously. The sense winding output voltage, including both a noise voltage and the sense voltage, is amplified by the sense amplifier 30, and supplied to the primary winding of output transformer 31.

The amplified sense winding output voltage B appearing on the center tapped secondary 32 of the output transformer 31 is applied to terminals 48, 49, and 50 of the comparator 45. The comparator 45 compares the amplified sense winding output voltage to a threshold voltage, and may provide an output pulse when the amplified sense voltage exceeds a threshold value. Since the amplified sense winding output voltage applied to the comparator 45 includes both a noise voltage and a sense voltage, and since the noise voltage peak precedes the sense voltage peak in time, the comparator 45 is inhibited from making a comparison of the comparator input to the threshold voltage during the duration of the noise voltage peak. To inhibit the comparator during this period, the comparator may be appropriately biased to prevent generation of an output signal. Then, to permit the comparator to compare the amplified sense voltage generated by the change of flux in the magnetic core 7, an enable pulse C is applied to the comparator after the peak of the noise voltage has passed. Accordingly, the enable pulse generator 43 is adapted to generate enable pulse C at a time determined by delay circuit 41 which coincides with the passing of the noise voltage peak at the input terminals 48, 49, and 50 of comparator 45. Therefore, when a core read pulse is generated by the pulse generator 3, and noise voltage is generated in the sense winding 28, the core read pulse is amplified by amplifier 35 and delayed by the delay circuit 41 for a time determined by the time required for the noise voltage generated in sense winding 28 to pass its peak value. Wave form B of FIG. 3 illustrates a typical amplified output wave form of a sense winding. It may be seen that the amplified noise voltage reaches its peak prior in time to the amplified sense voltage produced by the change of flux in the selected core of a core memory plane. The enable pulse C is applied to the comparator after the noise voltage has passed its peak, and as the sense signal begins to increase.

Since the parameters of the various cores of a core memory plane vary, the sense voltage produced by a change of flux in a selected core will vary relative to the other cores, and the time at which the amplified sense voltage exceeds the threshold will vary. Therefore, a strobe pulse F is provided for sampling the comparator to thereby provide a comparator output which will occur at a predetermined time relationship to the core read pulse, and thus eliminate time variations caused by core irregularities. Accordingly, strobe pulse generator 42 generates pulses F after a predetermined delay, caused by delay circuit 40, and permits the output of the comparator to occur at a definite time after the initiation of the enable pulse C. Thus, delay circuit 40 will delay the core read pulse from amplifier 35 slightly longer than the delay 41.

Thus, the memory sensing system of the present invention provides a means for comparing an amplified sense winding output voltage with a threshold voltage and provides an output pulse of predetermined amplitude and duration only when that portion of the amplified sense winding output voltage representing the sense voltage exceeds the predetermined threshold voltage.

Figure 2:
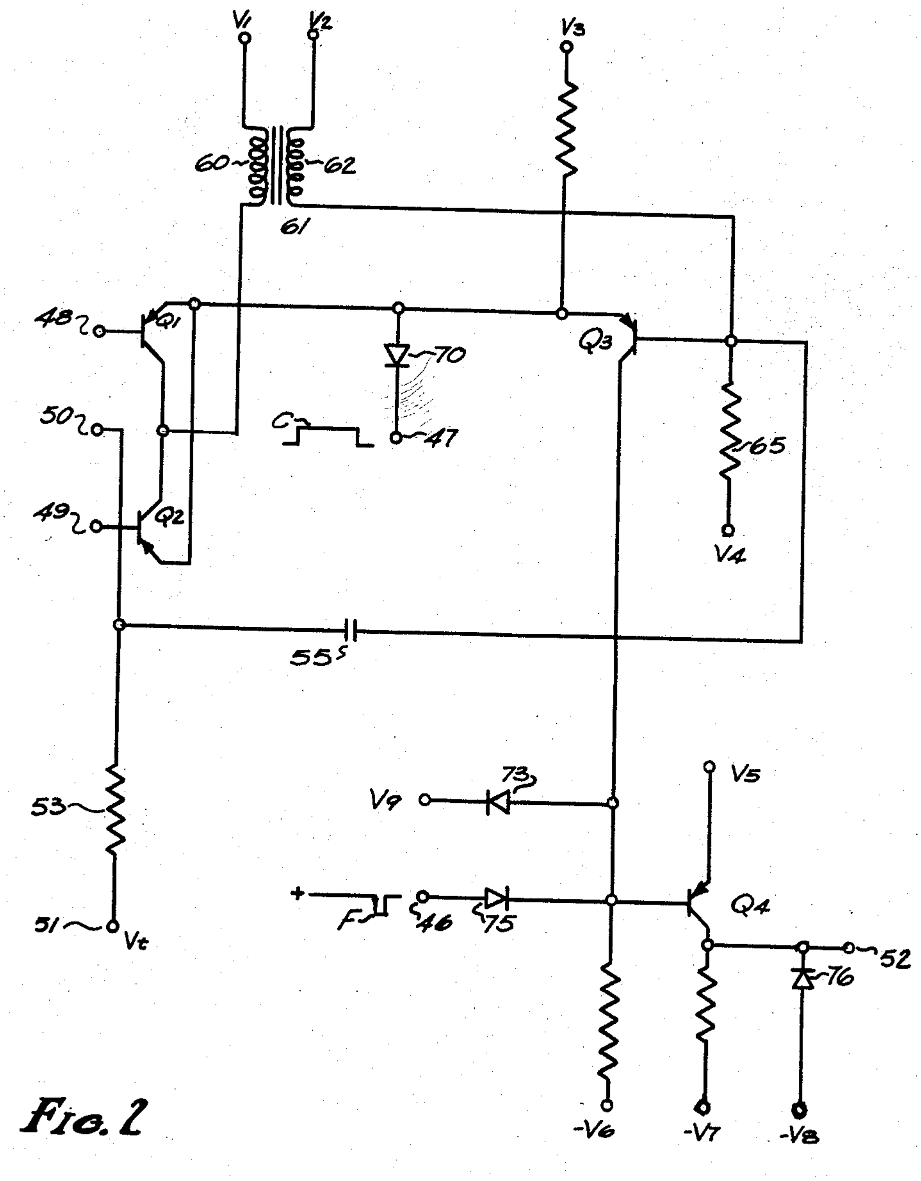
FIGURE 2 shows a novel comparator circuit for use in the memory sensing system of FIGURE 1.

FIG. 2 shows a circuit diagram of a novel comparator for use in the memory sensing system of FIG. 1. A pair of transistors $Q_1$ and $Q_2$ are provided having their respective base electrodes connected to terminals 48 and 49 to receive the amplified sense winding output voltage from the secondary winding of transformer 31. The emitter electrodes are connected to each other and to a source of bias potential $V_3$ and to the emitter electrode of a third transistor $Q_3$. The collector electrodes of transistors $Q_1$ and $Q_2$ are connected together and to a source of bias potential $V_1$ through the primary winding 60 of a transformer 61. The base electrode of transistor $Q_3$ is connected to a source of potential $V_4$ through a resistor 65; the base electrode is also connected to a second source of potential $V_2$ through the secondary winding 62 of transformer 61. A source of threshold bias potential $V_t$ is applied at terminal 51 and connected to the center tap of the output transformer secondary winding of FIG. 1 through terminal 50. A current limiting resistor 53 may be connected between the threshold bias potential at terminal 51 and the terminal 50. A capacitor 55, connected between terminal 50 and the base electrode of transistor $Q_3$, is provided for coupling any transients that may occur in the base circuit to the threshold bias circuit to thereby prevent any change in effective threshold potential. One terminal of a diode 70 is connected to the emitters of transistors $Q_1$, $Q_2$, and $Q_3$; the other terminal of diode 70 is connected to receive an enable pulse C supplied to the comparator at terminal 47. The collector electrode of transistor $Q_3$ is connected to a source of negative potential $-V_6$ through a resistor 72. A diode 73 is connected between the collector of the transistor $Q_3$ and a source of potential $V_9$ and is poled to permit current flow from the collector to the potential source. A diode 75 having one terminal connected to the collector of transistor $Q_3$ is adapted to receive strobe pulses F at the other terminal 46 thereof and is poled to permit easy current flow from the terminal 46. A fourth transistor $Q_4$, having its base electrode connected to the collector electrode of transistor $Q_3$, provides an output pulse to the output terminal 52. The emitter electrode of transistor $Q_4$ is connected to a source of potential $V_5$, and the collector is connected to a source of negative potential $-V_7$. A clamping diode 76 is connected between the collector electrode of transistor $Q_4$ and a negative potential source $-V_8$.

Figure 3:
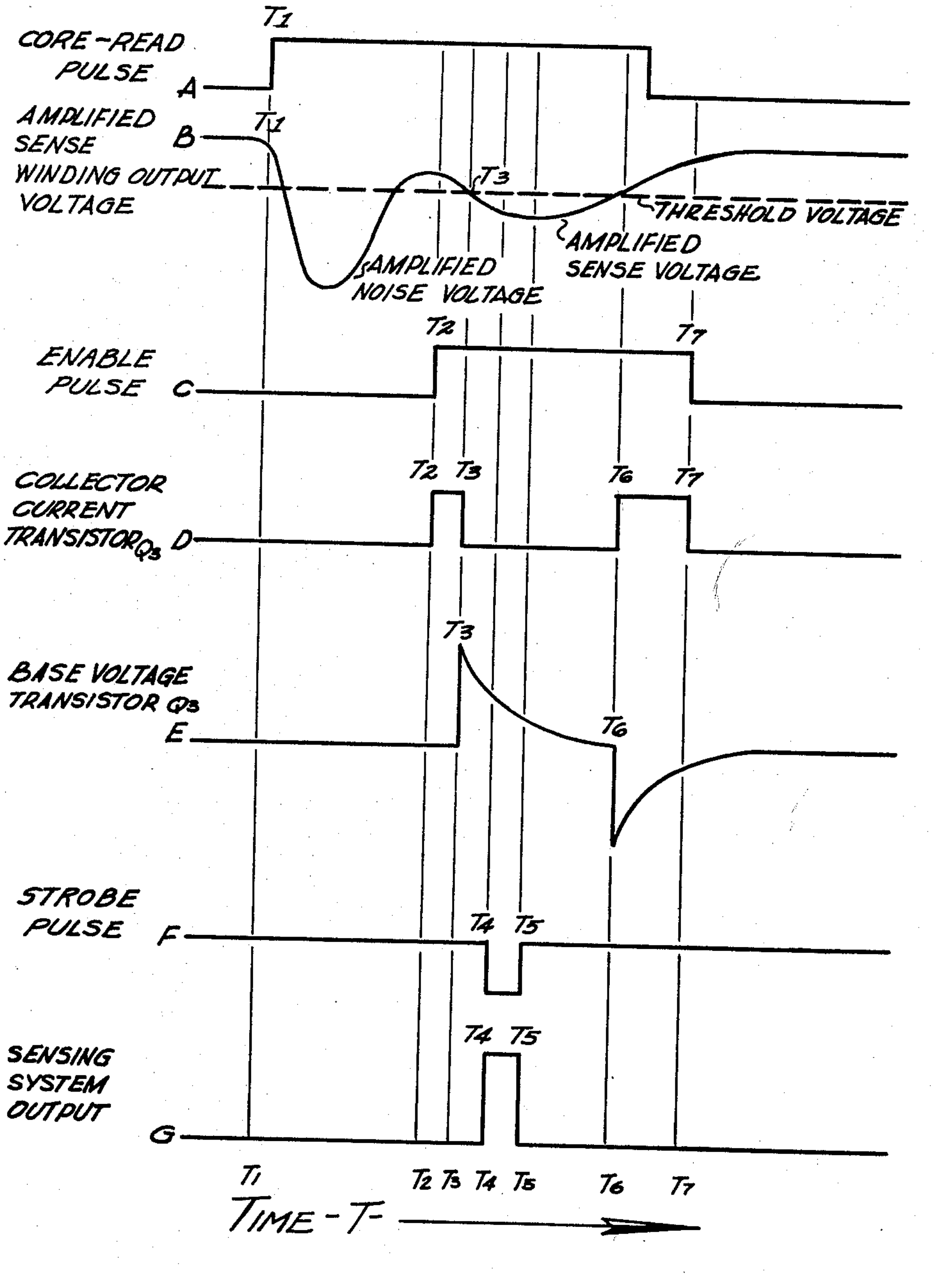
FIGURE 3 shows several wave forms which may be utilized to facilitate the explanation of the operation of the present invention.

The operation of the circuit of FIG. 2 may be explained with the aid of the wave forms of FIG. 3. It will be assumed initially that no strobe or enable pulse is present at the comparator terminals 46 or 47, and that no input signal is being supplied the comparator. Under these conditions, diode 70 is forward biased by the voltage source $V_3$, and current flows through the diode 70 thereby preventing transistors $Q_1$, $Q_2$, and $Q_3$ from conducting. A core read pulse A may then be supplied to the core memory plane, resulting in a sense winding output voltage B which will be amplified by the sense amplifier 30 and applied to the transformer 31. The amplified sense winding output voltage B includes an amplified noise voltage which may exceed the amplified sense voltage; therefore, the comparator circuit is allowed to remain in its inactive state for the duration of the amplified noise voltage peak, that is, diode 70 remains forward biased and continues to conduct thereby preventing transistors $Q_1$, $Q_2$, and $Q_3$ from conducting during the presence of the amplified noise voltage at the input terminals 48 and 49 of the comparator. After a delay sufficient to permit the amplified noise voltage to pass its peak value, an enable pulse C is applied to the terminal 47 to back bias diode 70, and permit transistor $Q_3$ to conduct. While transistor $Q_3$ is conducting, diode 73 acts as a collector voltage limiter, and limits the voltage in the collector circuit of transistor $Q_3$ to the value of the potential source $V_9$. The circuit remains with transistor $Q_3$ conducting, and transistors $Q_1$ and $Q_2$ nonconducting until the amplified sense voltage applied to terminals 48 and 49 exceeds a predetermined threshold voltage. Since terminal 50 is connected to the center tap of the secondary winding of the transformer 31, and since a threshold bias voltage $V_t$ is applied to the terminal 50 through terminal 51, the threshold voltage is then determined by the difference between the voltage existing at the emitter electrodes of transistors $Q_1$ and $Q_2$ and the voltage existing at terminal 50 ($V_t$), that is, the voltage required to drive either transistor $Q_1$ or transistor $Q_2$ to conduction. The amplified sense voltage applied to the primary winding of transformer 31 appears in the secondary winding on one side of the center tap as the inverse of the amplified sense voltage, and on the other side of the center tap as the uninverted amplified sense voltage. It may be seen that the polarity of the amplified sense voltage will not affect the operation of the circuit of FIG. 2 since the polarity merely determines which of the two transistors $Q_1$ or $Q_2$ will conduct. Assuming the amplified sense voltage applied to the comparator circuit FIG. 2 causes transistor $Q_1$ to conduct when the threshold voltage is exceeded, current will begin to flow from the potential source $V_3$ through the emitter to the collector circuit of transistor $Q_1$ and to the potential source $V_1$ through the primary 60 of transformer 61. The transformer 61 provides regenerative coupling between the collector circuits of transistors $Q_1$ and $Q_2$ and the base electrode of transistor $Q_3$; therefore, the increasing current in the collector circuit of transistor $Q_1$ causes a positive voltage to be applied to the base electrode of transistor $Q_3$ through the transformer secondary winding 62. This positive voltage tends to reduce the current in the emitter-collector circuit of transistor $Q_3$, thereby raising the potential at the emitter of transistor $Q_1$ which, in turn, further increases the current flow in the collector circuit of transistor $Q_1$. As a result of this regenerative action, transistor $Q_3$ ceases to conduct, and transistor $Q_1$ remains conducting. When the amplified sense voltage returns to a value below the threshold voltage, transistor $Q_1$ will cease to conduct.

When transistor $Q_3$ is not conducting, the base electrode of transistor $Q_4$ is maintained at a sufficiently positive potential to prevent transistor $Q_4$ from conducting. This positive potential may be provided at terminal 46 by the strobe pulse generator, that is, the potential applied to terminal 46 by the strobe pulse generator is normally positive, and the strobe pulse is a negative pulse with respect to the positive potential. When a strobe pulse F is applied to the terminal 46, diode 75 becomes back biased, and the potential on the base electrode of transistor $Q_4$ drops below the potential source $V_5$ and transistor $Q_4$ begins to conduct. Transistor $Q_4$ remains conducting for the duration of the strobe pulse F, and the output pulse G provided at terminal 52 by the comparator circuit is thus limited to a duration determined by the strobe pulse. Transistor $Q_3$ remains non-conducting for a time determined by the time constant of the RL circuit comprising the inductance of transformer 61 and resistance of resistor 65. When the voltage on the base electrode of transistor $Q_3$ decays to a value negative with respect to the emitter voltage, the transistor $Q_3$ once again begins to conduct. When the enable pulse C terminates, the diode 70 becomes forward biased and begins to conduct thereby returning the circuit to the state initially assumed wherein all transistors are non-conductors.

If the core being sensed is in the binary "0" state of saturation, no substantial flux change will occur, and no substantial sense voltage will be produced, when read current pulses are supplied to the X and Y windings of the core. When an enable pulse is supplied to the comparator, transistor $Q_3$ conducts as explained previously; however, since no amplified sense voltage is available at the comparator input to cause transistor $Q_1$ or $Q_2$ to conduct, transistor $Q_3$ will remain conducting for the duration of the enable pulse. Thus, when a strobe pulse is applied to the comparator, no output pulse is generated since the collector current of transistor $Q_3$ maintains the base electrode of transistor $Q_4$ more positive than the emitter electrode of $Q_4$.

The timing sequence of the memory sensing system of the present invention may best be understood by reference to the voltage and current waveforms illustrated in FIG. 3. Referring to FIG. 3, the time $T_1$ represents the initiation of the core read pulse A, and the initiation of the input, represented by the wave form B, to the comparator from the sense amplifier 30 of FIG. 1. The comparator enable pulse C is initiated at time $T_2$ by the enable pulse generator 43 after the amplified noise voltage passes its peak value. As soon as the comparator circuit receives the enable pulse at time $T_2$, the transistor $Q_3$ will be switched on, and collector current will flow. Assuming the particular core to be sensed is in a binary "1" state, the amplified sense voltage becomes greater algebraically than the threshold voltage at time $T_3$. At this time, through the regenerative action described in connection with FIG. 2, the collector current of transistor $Q_3$ ceases abruptly, and the base voltage arises. When the transistor base voltage of transistor $Q_3$ reaches its peak at time $T_3$, the RL time constant of the base circuit permits the voltage to decay until time $T_6$ when the transistor $Q_3$ again conducts. Between the times $T_3$ and $T_6$, a strobe pulse F from the strobe pulse generator 42 is initiated at $T_4$ and a comparator output pulse is begun. The strobe pulse cuts off at $T_5$, consequently cutting off the comparator output at $T_5$. At $T_6$, transistor $Q_3$ conducts, and continues to conduct until $T_7$ when the enable pulse is cut off. An inspection of the wave forms of FIG. 3 reveals that the time interval $T_1$–$T_2$ is the delay required between the initiation of the core read pulse and the comparator enable pulse and thus the delay required of the delay circuit 41 of FIG. 1. This time interval permits the amplified noise voltage at the comparator input to pass its peak. Further, the delay time represented by $T_1$–$T_4$ indicates the delay required of the delay circuit 41 of FIG. 1, that is, the delay from the initiation of the core read pulse to the initiation of the strobe pulse. It may also be seen that the time interval $T_3$–$T_6$, the time in which the transistor $Q_3$ is cut off, is the time during which an output pulse is obtained from the comparator by the application of a strobe pulse from the strobe pulse generator; and the time $T_4$–$T_5$, the duration of the strobe pulse F, is the duration of the output pulse G.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. A voltage comparing circuit comprising, a first and a second transformer each having a primary and a secondary winding, said secondary winding of said first transformer including a center tap, a threshold voltage source, means electrically connecting said threshold voltage source to the center tap on the secondary winding of said first transformer, four transistors each having a base electrode, a collector electrode, and an emitter electrode, means electrically connecting the emitter electrodes of each of the first, second, and third transistors of said four transistors to a common source of bias potential, means electrically connecting the collector electrodes of the first and second transistors of said four transistors to each other and to a source of bias potential through the primary winding of said second transformer, means electrically connecting the base electrode of the third transistor of said four transistors to a source of bias potential through the secondary winding of said second transformer, means electrically connecting the base electrodes of said first and second transistors to opposite sides of the secondary winding of said first transformer, and means electrically connecting the base electrode of the fourth transistor of said four transistors to the collector electrode of said third transistor.

2. A voltage comparing circuit comprising, a transformer having a primary and a secondary winding, three transistors each having a base electrode, a collector electrode, and an emitter electrode, means electrically connecting the emitter electrode of each of said three transistors to a common source of bias potential, means electrically connecting the collector electrodes of the first and second transistor of said three transistors to each other and to a source of bias potential through the primary winding of said transformer, means electrically connecting the base electrode of the third transistor of said three transistors to a source of bias potential through the secondary winding of said transformer, a unidirectional conducting device electrically connected to the emitter electrodes of said transistors and poled so as to shunt said emitter electrodes thereby rendering said transistors non-conducting, and means providing a pulse for back-biasing said unidirectional device to prevent said device from shunting the emitters of said transistors.

3. A voltage comparing circuit comprising, a first and a second transformer each having a primary and a secondary winding, the three transistors each having a base electrode, a collector electrode, and an emitter electrode, means electrically connecting the emitter electrode of each of said three transistors to a common source of bias potential, means electrically connecting the collector electrodes of the first and second transistors of said three transistors to each other and to a source of bias potential through the primary winding of said first transformer, means electrically connecting the base electrode of the third transistor of said three transistors to a source of bias potential through the secondary winding of said first transformer, means electrically connecting the base electrodes of the first and second transistors to opposite sides of the secondary winding of said second transformer, a unidirectional conducting device electrically connected to the emitter electrodes of said three transistors and poled so as to shunt said emitter electrodes thereby rendering said transistors non-conducting, and means providing a pulse for back-biasing said unidirectional device to prevent said device from shunting the emitter electrodes of said transistors.

4. A voltage comparing circuit comprising, a first and a second transformer each having a primary and a secondary winding, said secondary winding of said first transformer including a center tap, a threshold voltage source, means electrically connecting said threshold voltage source to the center tap on the secondary winding of said first transformer, three transistors each having a base electrode, a collector electrode, and an emitter electrode, means electrically connecting the emitter electrode of each of said three transistors to a common source of bias potential, means electrically connecting the collector electrodes of the first and second transistors of said three transistors to each other and to a source of bias potential through the primary winding of said second transformer, means electrically connecting the base electrode of the third transistor of said three transistors to a source of bias potential through the secondary winding of said second transformer, means electrically connecting the base elecrodes of said first and second transistors to opposite sides of the secondary winding of said first transformer, a unidirectional conducting device electrically connected to the emitter electrode of said three transistors and poled so as to shunt said emitter electrodes thereby rendering said transistors non-conducting, and means for providing a pulse for back-biasing said unidirectional device to prevent said device from shunting the emitters of said transistors.

5. A voltage comparing circuit comprising, a first and a second transformer each having a primary and a secondary winding, four transistors each having a base electrode, a collector electrode, and an emitter electrode, means electrically connecting the emitter electrode of each of the first, second, and third transistors of said four transistors to a common source of bias potential, means electrically connecting the collector electrodes of the first and second transistors of said four transistors to each other and to a source of bias potential through the primary winding of said first transformer, means electrically connecting the base electrode of the third transistor of said four transistors to a source of bias potential through the secondary winding of said first transformer, means electrically connecting the base electrodes of said first and second transistors to opposite sides of the secondary winding of said second transformer, means electrically connecting the base electrode of the fourth transistor of said four transistors to the collector electrode of said third transistor, a unidirectional conducting device electrically connected to the emitter electrodes of said first, second, and third transistors and poled so as to shunt said emitter electrodes thereby rendering said transistors nonconducting, and means providing a pulse for back-biasing said unidirectional device to prevent said device from shunting the emitter electrodes of said first, second, and third transistors.

6. A voltage comparing circuit comprising, a transformer having a primary and a secondary winding, three transistors each having a base electrode, a collector electrode, and an emitter electrode, means electrically connecting the emitter electrode of each of said three transistors to a common source of bias potential, means electrically connecting the collector electrode of the first and second transistors of said three transistors to each other and to a source of bias potential through the primary winding of said transformer, and means electrically connecting the base electrode of the third transistor of said three transistors to a source of bias potential through the secondary winding of said transformer.

7. A voltage comparing circuit comprising, a first and a second transformer each having a primary and a secondary winding, three transistors each having a base electrode, a collector electrode, and an emitter electrode, means electrically connecting the emitter electrode of each of said three transistors to a common source of bias potential, means electrically connecting the collector electrodes of the first and second transistors of said three transistors to each other and to a source of bias potential through the primary winding of said first transformer, means electrically connecting the base electrode of the third transistor of said three transistors to a source of bias potential through the secondary winding of said first transformer, and means electrically connecting the base electrode of said first and second transistors to opposite sides of the secondary winding of said second transformer.

8. A voltage comparing circuit comprising, a first and a second transformer each having a primary and a secondary winding, four transitsors each having a base electrode, a collector electrode, and an emitter electrode, means electrically connecting the emiter electrodes of each of the first, second, and third transistors of said four transistors to a common source of bias potential, means electrically connecting collector electrodes of the first and second transistors of said four transistors to each other and to a source of bias potential through the primary winding of said first transformer, means electrically connecting the base electrode of a third transistor of said four transistors to a source of bias potential through the secondary winding of said first transformer, means electrically connecting the base electrodes of said first and second transistors to opposite sides of the secondary winding of said second transformer, and means electrically connecting the base electrode of the fourth transistor of said four transistors to the collector electrode of said third transistor.

References Cited by the Examiner

UNITED STATES PATENTS

| | | | |
|---|---|---|---|
| 2,787,418 | 4/57 | MacKnight | 340—347 |
| 2,905,837 | 9/59 | Barry | 307—88.5 |
| 2,964,238 | 12/60 | King | 340—174 |
| 2,988,731 | 6/61 | Kam Li | 340—174 |
| 3,008,129 | 11/61 | Katz | 340—174 |
| 3,015,809 | 1/62 | Myers | 340—174 |
| 3,098,995 | 7/63 | Mundt | 340—146.2 |
| 3,102,994 | 9/63 | Stampler | 340—146.2 |

IRVING L. SRAGOW, *Primary Examiner.*

BERNARD KONICK, *Examiner.*